3,177,243
PROCESS FOR PRODUCING HALOGENATED ESTERS
Tommy L. Tolbert, Chapel Hill, and William A. Waddell, Jr., Durham, N.C., assignors, by mesne assignments, to Monsanto Company, a corporation of Delaware
No Drawing. Filed Jan. 16, 1961, Ser. No. 82,709
9 Claims. (Cl. 260—487)

This invention relates to a new and improved process for the preparation of vinyl esters of halogenated aliphatic acids of the class represented by

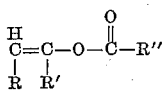

where R and R' are H, lower alkyl, or mixtures thereof and where R'' is a halogen substituted lower alkyl or a mixed halogen substituted lower alkyl, and more particularly to a new and improved continuous process for the preparation of vinyl trifluoroacetate and vinyl chlorofluoroacetate.

It is known in the art that these esters have been prepared by batch processes in which a halogenated monocarboxylic acid is reacted with acetylene in liquid phase in the presence of a mercury salt catalyst. Also known in the art is the reaction of acetylene gas and vapors of trifluoroacetic acid, heated to around 170° C. and passed over a heated catalyst comprising a compound of zinc or cadmium, such as a salt of these elements with a saturated fatty acid. However, the above processes are batch methods, time consuming and very inefficient, yielding around 30–60 percent of esters. The catalyst life is short, a variety of by-products are formed which must be removed from the mixture in order to obtain a substantially pure ester, and little unreacted acid is recovered. The above disadvantages, plus the necessity of an elaborate system for separating the ester from by-products, make these processes rather expensive. It is also noted that the processes of the prior art require high temperatures which in turn require additional equipment.

An object of this invention is to provide a continuous method for the production of vinyl halogenated aliphatic esters.

An object of this invention is to provide a continuous method for the production of vinyl trifluoroacetate in which the by-products formed are less than 5 percent.

An object of this invention is to provide a continuous method for the production of vinyl chlorodifluoroacetate in which the by-products formed are less than 5 percent.

An object of this invention is to provide a continuous process for the production of vinyl trifluoroacetate and vinyl chlorodifluoroacetate which is cheaper and quicker than batch processes.

An object of this invention is to provide a continuous process for the production of vinyl trifluoroacetate and vinyl chlorodifluoroacetate in which the unreacted starting materials are easily recycled.

An object of this invention is to provide a continuous method for the production of vinyl trifluoroacetate and vinyl chlorodifluoroacetate in which the yield is at least 85 percent and up to 98 percent.

An object of this invention is to provide a continuous method for the production of vinyl trifluoroacetate and vinyl chlorodifluoroacetate in which the temperature range is substantially lower than in the batch processes.

Other objects of this invention will hereinafter become apparent in the following description and appended claims.

The objects of this invention are achieved by passing a stream of gas containing dry acetylene into a warmed mixture of a halogenated, aliphatic acid, a catalyst, and a polymerization inhibitor; directing the stream of gas flowing away from the reaction zone through a condenser and a series of cold traps to condense the newly formed halogenated ester and unused acid vapors; subjecting the condensate to fractional distillation or any other conventional separation method, such as chromatographic fractionation, to separate the ester from the acid and recycling the recovered acetylene and acid to the reaction zone. Thus, the acid vapors and the ester vapors are carried away from the reaction center in the stream of acetylene-containing gas, leaving substantially all the impurities and by-products in the reaction zone, enabling a successful recycling of substantially pure acid and acetylene and their reuse in the process. Removal of ester and acid leaves a substantially pure stream of acetylene which may be reused in the process. The acid, after separation from the ester, is recycled for subsequent use in the process without the shutting down of same. This is in the opinion of the inventors the first continuous method for the production of vinyl halogenated aliphatic esters.

More specifically, acetylene gas, pure or carried by an inert gas such as nitrogen, argon, etc., is passed into a liquid reaction mixture containing a halogenated, aliphatic monocarboxylic acid, such as halogenated acetic, propionic, butyric, valeric and caproic acids, in which the halogens are the same or mixed, in other words, all those halogenated aliphatic monocarboxylic acids which have a boiling point higher than their vinyl or substituted vinyl esters; a conventional catalyst for an acetylene reaction of this type, e.g., a 50–50 mixture by weight of mercuric sulfate and mercuric oxide or other salts of cations from the Periodic Table Group IIB; a conventional polymerization inhibitor, if desired, such as hydroquinone; and a conventional inert diluent, if desired, such as mineral oil. Reaction seems to be almost immediate, but it is only after the reaction mixture has become saturated with the product ester that the latter begins to appear in significant quantities in the cold traps. From this point until the reaction is discontinued, ester is produced continuously.

The amounts of polymerization inhibitor, diluent, and catalyst which can be used in the reaction in order to obtain high yields of ester vary over wide ranges. The quantity, both maximum and minimum, of each of the commonly used vinyl polymerization inhibitors effective in inhibiting polymerization have been well established and are well known in the art. The amounts of inert diluent which can be used are restricted only by practical limitations of handling, desired rate of reaction, and system design. Only catalytic quantities of catalyst are required to obtain reaction, but, if desired, the ratio of catalyst weight to weight the initial acid charge can be high. The rate of flow of the acetylene gas or the mixture of acetylene with an inert gas carrier is of importance. There must be a flow of at least enough gas to remove the ester from the reaction zone as it is formed. The maximum flow will be determined by the apparatus used: thus there should not be excessive splashing of the liquid in the reaction zone onto the sides of the vessel, and the rate should be slow enough for the condenser and traps to condense the vapors of the newly formed ester and entrained acid conveniently from the gaseous mixture. The temperature requirement of the reaction mixture are such that the reaction temperature will be no higher than the boiling point of the parent acid, yet sufficiently high to produce a convenient rate of reaction, e.g., the preferred temperature for preparing vinyl trifluoroacetate is up to and about 48° C., the boiling point of the ester being around 40° C. and that of the acid around 70° C.

The condenser assembly and cold traps, used to remove everything except acetylene from the effluent gas stream, may be cooled by any convenient means, e.g., ice water or Dry Ice-acetone mixtures. The actual choice depends on the design of the system. The only limitation on the coolant is that the temperature at which it operates must be below the boiling point of the product ester and above the condensation point of acetylene. The process of this invention generally operates under atmospheric pressure but it could proceed under either increased or reduced pressure as long as the boiling point of the ester produced is lower than that of the parent acid.

The following examples are intended to illustrate the new process of the instant invention more fully, but are not intended to limit the scope of the invention, for it is possible to effect many modifications therein. In the examples, all parts and percents are by weight unless otherwise indicated.

Example I

In a one-liter, three-necked, round-bottomed flask equipped with a gas inlet tube, a pot thermometer, a magnetic stirrer, and a 12-inch Vigreux column was placed a mixture of 669 grams of anhydrous liquid trifluoroacetic acid, 2 grams of hydroquinone, 3.5 grams of mercuric oxide and 3.5 grams of mercuric sulfate. Into this mixture, stirred and held at 40° to 48° C., was passed 4000–450 cc. per minute of dry acetylene gas. The level in the reactor was maintained essentially constant by the gradual addition of more acid. The vinyl trifluoroacetate produced by this reaction was swept from the reaction zone by the flow of unreacted acetylene. The major portion of entrained acid was removed from the gas stream in the Vigreux column and returned to the reaction zone. The major portion of ester vapors and the remainder of entrained acid were removed from the gas stream by condensation in a water-cooled condenser and receiver assembly. The remainder of the ester in the gas stream was collected in a series of cold traps held at Dry Ice temperature. The acetylene gas, with the entrained acid and ester vapors removed, was then in condition for being recycled. The ester and acid were separated by distillation with the acid being recycled to the reaction zone. During the addition of a total of 1353 grams more of acid, 972 grams of acid was recovered for recycling, along with 1153 grams of vinyl trifluoroacetate, representing a conversion of 46.5 percent and a yield of 89.5 percent. The pot residue amounted to less than 5 percent of the total amount of trifluoroacetic acid consumed in the overall reaction.

Example II

Into a flask of the type used in Example I was introduced a mixture of 309 grams of trifluoroacetic acid, 2 grams of hydroquinone, 5 grams of mercuric oxide and 5 grams of mercuric sulfate. The reaction system was swept with dry nitrogen to clear it of air and moisture. Dry acetylene gas was bubbled into the reaction mixture, held at 43° C. to 47° C., at a rate so that there was substantially no splashing. Within a few minutes the reaction mixture changed color from a pale orange to black and the temperature of the mixture rose 4.5° C., thus indicating a reaction was taking place. Soon the reaction mixture became saturated with ester and liquid began to appear in the receivers. When the liquid level of the reaction mixture had dropped preceptibly, the gradual addition of acid was started in order to maintain a constant level in the reactor; the addition was continued until a total of 892 grams of acid had been added to the original mixture. After a total reaction time of approximately 20 hours, the reaction was discontinued. As in Example I the reaction vapors were condensed in a water-cooled condenser and receiver assembly and in series of cold traps. Distillation of the condensate gave 622 grams of recovered acid, boiling point 72.5° C., and 649 grams of the vinyl trifluoroacetate, boiling point 40–41° C., representing a conversion of 44.2 percent and a yield of 91.3 percent.

Example III

Into an apparatus of the type used in Example I, swept with nitrogen gas, was introduced a mixture of 720 grams of trifluoroacetic acid, 3 grams of hydroquinone, 7 grams of mercuric oxide and 7 grams of mercuric sulfate. Dry acetylene gas was bubbled into the reaction mixture, held at 39–49° C., at a rate so that there was substantially no splashing. Within a few minutes the reaction mixture changed color from a pale orange to black and the temperature of the mixture rose about 5° C., thus indicating a reaction was taking place. As condensate was collected additional acid was gradually added in order to maintain a constant level in the reactor; the addition was continued until a total of 1821 grams of acid had been added to the original mixture. After a total reaction time of approximately 28 hours, the reaction was discontinued. Reaction vapors were condensed in the same way as in Example I. Distillation of the condensate gave 1191.5 grams of recovered acid, boiling point 72.5° C., and 1442 grams of vinyl trifluoroacetate, boiling point 40–41° C., representing a conversion of 46.2 percent and a yield of 87.3 percent. The pot residue amounted to less than 5 percent of the total amount of trifluoroacetic acid consumed in the overall reaction.

Example IV

Into a reactor of the type used in Example I was introduced a mixture of 366 grams of chlorodifluoroacetic acid (a commercial sample shown by gas chromatography to be only 70 per cent pure), 1 gram of hydroquinone, 3 grams of mercuric oxide and 3 grams of mercuric sulfate. The reaction system was swept with dry nitrogen to clear it of air and moisture. Dry acetylene gas was bubbled into the reaction mixture, held at 85–95° C., at a rate that avoided splashing. Within a few minutes the reaction mixture changed color from orange to black and the temperature of the mixture rose several degrees, thus indicating a reaction was taking place. The addition was continued until a total of 236 grams of acid had been added to the original mixture. At the end of a 13 hour run followed by a temporary shutdown, an additional 2 grams of mercuric oxide and 2 grams of mercuric sulfate were added. After a total reaction time of approximately 18 hours, the reaction was discontinued. The reaction vapors were condensed in the same way as in Example I. Distillation of the condensate gave 161.7 grams of recovered pure acid, boiling point 122° C., and 307.3 grams of vinyl chlorodifluoroacetate, boiling point 75–76° C., representing a conversion of 59.9 percent and a yield of 97.5 percent.

Example V

Into a reactor of the type used in Example I was introduced a mixture of 770.5 grams of chlorodifluoroacetic acid (a commercial sample shown by gas chromatography to be only 70 percent pure), 1 gram of hydroquinone, 3 grams of mercuric oxide and 3 grams of mercuric sulfate. The reaction system was swept with dry nitrogen to clear it of air and moisture. Dry acetylene gas was bubbled into the reaction mixture, held at 74–80° C., at a rate that avoided splashing. The usual color change and temperature rise were observed. After approximately 10 hours, an additional 3 grams of mercuric oxide and 3 grams of mercuric sulfate were added. After a total reaction time of approximately 23 hours, the reaction was discontinued. The reaction vapors were condensed in the same way as in Example I. Distillation of the condensate gave 134 grams of pure recovered acid, boiling point 122° C., and 480.1 grams of vinyl chlorodifluoroacetate, boiling point 75–76° C., representing a conversion of 75 percent and a yield of 98.3 percent.

Contrary to the teachings of the prior art on continuous processes, vinyl esters of halogenated aliphatic acids were prepared by the method of this invention. Not only have these esters been prepared, but a continuous process was used which resulted in extraordinarily high yields, up to 98 percent, as well as a very low percentage of by-products. The process of this invention enables one easily to separate or remove the newly formed esters from the reaction zone by removing them as fast as they are formed by sweeping them from the zone with a stream of gas. This sweeping carries with it only the ester and some entrained acid which are swiftly and easily separated by condensation and distillation, thus enabling a rapid recycling of the acid and acetylene. As this is a continuous process producing high yields of product, it is obvious that it enables preparation of the product more quickly, easily and economically than known batch processes.

It is understood that changes and variations may be made in the present invention by one skilled in the art without departing from the spirit and scope thereof as defined in the appended claims.

What is claimed is:

1. A method for the continuous preparation of vinyl halogenated aliphatic esters in a liquid system, comprising passing a stream of gas containing dry acetylene through a mixture of an anhydrous, halogenated, aliphatic monocarboxylic acid, a catalyst, a polymerization inhibitor and an inert diluent heated to a point within a temperature of from 39° C. to 95° C., entraining the ester in the stream of gas to remove said ester from the reaction zone as said ester is formed, separating the ester and entrained acid from the stream of gas flowing away from the reaction zone, recycling the gas stream containing dry acetylene to the reaction zone, separating the condensed ester and acid, recycling the acid to the reaction zone and removing the ester from the system.

2. A method for the continuous preparation of vinyl halogenated aliphatic ester in a liquid system of the class represented by the formula

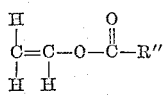

where R″ is selected from the group consisting of a halogen substituted lower alkyl and a mixed halogen substituted lower alkyl, comprising bubbling a stream of gas containing dry acetylene and an inert gas carrier through a mixture of an acid, selected from the group consisting of halogenated acetic, propionic, butyric, valeric and caproic acids, at a flow rate so that there will be no substantial splashing of the mixture onto the walls of the reaction vessel but at a flow rate which will remove the ester vapors as quickly as they are formed, a catalyst, a polymerization inhibitor, an inert diluent, heating this mixture within a range no higher than the boiling point of the parent acid, and no lower than the boiling point of the ester produced, sweeping the ester as fast as it is produced out of the reaction zone by the flow of the acetylene gas, separating the ester produced and entrained acid from the stream of gas containing dry acetylene and an inert gas carrier by cold traps, recycling the acetylene to the reaction zone, separating the condensed acid and ester by fractional distillation, recycling said acid to the reaction zone nad removing the ester produced from the system.

3. The process of claim 2 in which the acid is chlorodifluoroacetic acid.

4. The process of claim 2 in which the acid is trifluoropropionic acid.

5. The process of claim 2 in which the acid is trifluorobutyric acid.

6. The process of claim 2 in which the acid is trifluorovaleric acid.

7. The process of claim 2 in which the acid is trifluorocaproic acid.

8. A method for the continuous preparation of vinyl trifluoroacetate in a liquid system comprising evacuating the system by passing dry nitrogen gas through same, bubbling a stream of dry acetylene at the rate of about 400 cc. per minute through a mixture of trifluoroacetic acid, mercuric oxide and mercuric sulfate, hydroquinone and mineral oil, heating the mixture up to about 45° C., removing the vinyl trifluoroacetate vapors as they are formed on the stream of dry acetylene gas, passing this stream of gas and vapors through cold traps, which condense the entrained trifluoroacetic acid vapors and the vinyl trifluoroacetate vapors, removing them from the stream of acetylene gas, recycling the acetylene to the reaction zone, separating the condensed trifluoroacetic acid and vinyl trifluoroacetate ester by distilling off at their respective boiling points, recycling the separated trifluoroacetic acid to the reaction zone and removing the vinyl trifluoroacetate from the system.

9. A method for the continuous preparation of vinyl chlorodifluoroacetate in a liquid system comprising evacuating the system by passing dry nitrogen gas through same, bubbling a stream of dry acetylene gas into a mixture at a sufficiently fast rate to remove vinyl chlorodifluoroacetate as it is formed but slow enough so that there is no substantial splashing onto the walls of a reaction vessel, said mixture comprising chlorodifluoroacetic acid, mercuric oxide, mercuric sulfate, hydroquinone and mineral oil, heating said mixture up to about 85° C. to 95° C., removing the vinyl chlorodifluoroacetate vapors as they are formed on the stream of dry acetylene gas, passing this stream of gas and vapors through cold traps, which condense the entrained chlorodifluoroacetic acid vapors and vinyl chlorodifluoroacetate vapors, removing them from the stream of acetylene gas, recycling the acetylene gas to the reaction zone, separating the condensed chlorodifluoroacetic acid and vinyl chlorodifluoroacetate ester by distilling off at their respective boiling points, recycling the separated chlorodifluoroacetic acid to the reaction zone and removing the vinyl chlorodifluoroacetate from the system.

References Cited by the Examiner
UNITED STATES PATENTS 2,436,144  2/48  Howk et al. _____ 260—487
2,525,526  10/50 Coover et al. _____ 260—487

LORRAINE A. WEINBERGER, *Acting Primary Examiner.*

TOBIAS E. LEVOW, LEON ZITVER, *Examiners.*